(12) United States Patent
Cates

(10) Patent No.: US 10,023,481 B2
(45) Date of Patent: Jul. 17, 2018

(54) MATERIALS AND METHODS FOR REDUCING BIOFOULING IN WATER TREATMENT MEMBRANE SYSTEMS

(71) Applicant: Clemson University, Clemson, SC (US)

(72) Inventor: Ezra Lucas Hoyt Cates, Greenville, SC (US)

(73) Assignee: Clemson University, Clemson, SC (US)

( * ) Notice: Subject to any disclaimer, the term of this patent is extended or adjusted under 35 U.S.C. 154(b) by 355 days.

(21) Appl. No.: 14/882,773

(22) Filed: Oct. 14, 2015

(65) Prior Publication Data

US 2016/0107126 A1 Apr. 21, 2016

Related U.S. Application Data

(60) Provisional application No. 62/065,359, filed on Oct. 17, 2014.

(51) Int. Cl.
*B01D 65/02* (2006.01)
*C02F 1/469* (2006.01)
(Continued)

(52) U.S. Cl.
CPC ............ *C02F 1/4695* (2013.01); *B01D 65/08* (2013.01); *C02F 1/307* (2013.01); *C02F 1/44* (2013.01);
(Continued)

(58) Field of Classification Search
CPC .......... B01D 2321/34; B01D 2321/343; B01D 2321/346; B01D 2311/04; B01D 63/02; B01D 63/06; B01D 67/0088; B01D 65/08; B01D 65/02; B01D 65/022; B01D 69/02; B01D 69/08; C02F 1/307; C02F 1/305;
(Continued)

(56) References Cited

U.S. PATENT DOCUMENTS 6,113,792 A 9/2000 Benjamin et al.
7,026,014 B2 4/2006 Luzinov et al.
(Continued)

OTHER PUBLICATIONS

Rahul-Ashok Damodar, Sheng-Jie You, Guan-Wei Chiou, Investigation on the conditions mitigating membrane fouling caused by TiO2 deposition in a membrane photocatalytic reactor (MPR) used for dye wastewater treatment, Journal of Hazardous Materials, vols. 203-204, 2012. (Year: 2012).*
(Continued)

*Primary Examiner* — Pranav N Patel
(74) *Attorney, Agent, or Firm* — Dority & Manning, PA

(57) ABSTRACT

Methods and systems for preventing biofouling of membranes utilized in water treatment processes (i.e., water treatment membranes) are described. Methods include X-ray excitation of luminescent materials capable of emitting in the violet to UV range (e.g., from about 180 nm to about 440 nm). X-rays are directed at water treatment modules to contact the luminescent materials within the modules and excite internal violet/UV to prevent biofouling of membranes. The methods can be utilized in conjunction with existing processing equipment and can prevent biofouling of water treatment membranes in high volume treatment processes in an environmentally friendly fashion.

12 Claims, 5 Drawing Sheets

(51) Int. Cl.
*C02F 1/44* (2006.01)
*B01D 65/08* (2006.01)
*C02F 1/30* (2006.01)
*B01D 63/10* (2006.01)
*B01D 63/02* (2006.01)

(52) U.S. Cl.
CPC .............. *B01D 63/02* (2013.01); *B01D 63/10* (2013.01); *B01D 2321/168* (2013.01); *B01D 2321/34* (2013.01); *C02F 1/441* (2013.01); *C02F 1/442* (2013.01); *C02F 1/444* (2013.01); *C02F 1/445* (2013.01); *C02F 1/447* (2013.01); *C02F 2303/20* (2013.01)

(58) Field of Classification Search
CPC .... C02F 1/30; C02F 1/32; C02F 1/325; C02F 1/441; C02F 1/444; C02F 2303/20; C02F 2303/04; A61L 2/082; A61L 2/10; A61L 2/08; B01J 19/125; B01J 19/123
See application file for complete search history.

(56) References Cited

U.S. PATENT DOCUMENTS

| | | |
|---|---|---|
| 7,985,451 B2 | 7/2011 | Luzinov et al. |
| 8,017,050 B2 | 9/2011 | Freeman et al. |
| 8,382,981 B2 | 2/2013 | Rogers et al. |
| 8,580,115 B2 | 11/2013 | Krause et al. |
| 2010/0096326 A1 | 4/2010 | Najmy et al. |
| 2012/0125839 A1 | 5/2012 | Watari et al. |
| 2012/0228219 A1 | 9/2012 | Goebel et al. |
| 2013/0037484 A1 | 2/2013 | Chen |
| 2013/0284667 A1 | 10/2013 | Pinnavaia et al. |
| 2014/0083931 A1 | 3/2014 | Chang et al. |

OTHER PUBLICATIONS

Camacho et al.; "Advances in Membrane Distillation for Water Desalination and Purification Applications," *Water*, (2013) 5, pp. 94-196.

Cates et al.; "Converting Visible Light into UVC: Microbial Inactivation by $Pr^{3+}$-Activated Upconversion Materials," *Enviromental Science & Tachnology*, (2011) 45, pp. 3680-3686.

Cates et al.; "Upconversion under polychromatic excitation: $Y_2SiO_5:Pr^{3+}$, $Li^+$ converts violet, cyan, green, and yellow light into UVC," *Optical Materials*, (2013) 35, pp. 2347-2351.

Cates et al.; Accepted Manuscript—"Bench-scale evaluation of water disinfection by visible-to-UVC upconversion under high-intensity irradiation," *Photochemistry & Photobiology*, (2015) doi: 10.1016/j.jphotobiol.2015.10.021; (29 pages).

Cates et al.; "Delineating Mechanisms of Upconversion Enhancement by Li+ Codoping in $Y_2SiO_5:Pr^{3+}$," *J. Phys. Chem. C*, (2012) 116, pp. 12772-12778.

Cates et al.; "Visible-to-UVC upconversion efficiency and mechanisms of $Lu_7O_6F_9$: $Pr^{3+}$ and $Y_2SiO_5:Pr^{3+}$ ceramics," *Journal of Luminescence*, (2015) 160, pp. 202-209.

Cates et al.; "Synthesis and Characterization of Visible-to-UVC Upconversion Antimicrobial Ceramic," *Enviromental Science & Technology*,, (2014) 48, pp. 2290-2297.

Cates et al.; "Engineering Light: Advances in Wavelength Conversion Materials for Energy and Enviromental Technologies," *Environmental Science & Technology*,, (2012) 46, pp. 12316-12328.

Fujimoto et al.; "Optical and scintillation properties of Pr3R-doped Ca3(BO3)2 single crystals," *Phys. Status Solidi B*, (2011) 248 (2), pp. 444-447.

Goldman et al.; "The effects of gamma radiation sterilization and ageing on the structure and morphology of medical grade ultra high molecular weight polyethylene," *Polymer*, (1996) 37 (14), pp. 2909-2913.

Hilal et al.; "Surface modified polymeric membranes to reduce (bio)fouling: a microbiological study using *E. coli*," *Desalination*, (2004) 167, pp. 293-300.

Hoertz et al.; "Photocatalyticandradiocatalyticnanomaterialsforthedegradation of organicspecies," *Radiation Physics and Chemistry*, (2013) 84, pp. 51-58.

Kurucz, et al., "High Energy Electron Beam Irradiation of Water," *Wastewater and Sludge, in Advances in Nuclear Science and Technology*, J. Lewins and M. Becker, Editors. (1991) Springer US, pp. 1-43.

Mansouri et al.; "Strategies for controlling biofouling in membrane filtration systems: challenges and opportunities†," *J. Mater. Chem.*, (2010) 20, pp. 4567-4586.

Mueller et al.; "Large area radiation source for water and wastewater treatment," *Proc. of SPIE*, vol. 8029, 80290J-1 (7 pages).

Nguyen et al.; "Biofouling of Water Treatment Membranes: A Review of the Underlying Causes, Monitoring Techniques and Control Measures," *Membranes*, (2012) 2, pp. 804-840.

Sawada, et al.; "Development of a hydrophilic polymer membrane containing silver nanoparticles with both organic antifouling and antibacterial properties," *Journal of Membrane Science*, (2010) 387-388, pp. 1-6.

Yang et al.; Application of nanosilver surface modification to RO membrane and spacer for mitigating biofouling in seawater desalination, *Water Research* (2009) 43, pp. 3777-3786.

Yu et al.; "Decomposition of organic resin by radio-sensitive photocatalyst," *Journal of Photochemistry & Photobiology A: Chemistry*, (2007) 186, pp. 369-375.

Website: http://www.aqualuxwater.com/eid.htm (Printed Oct. 7, 2015) (1 page).

* cited by examiner

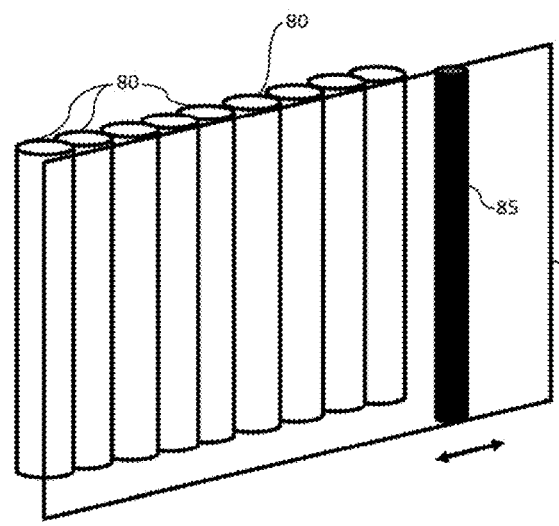
FIG. 8
FIG. 9
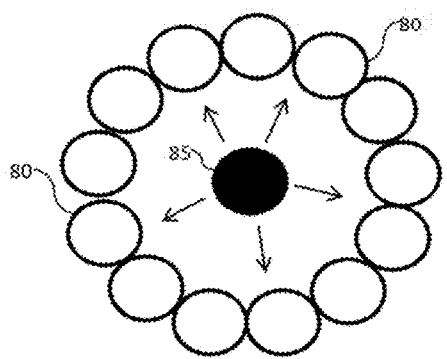
FIG. 10
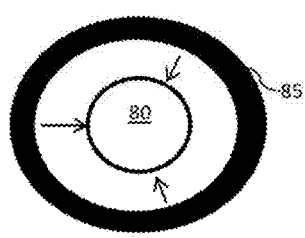

MATERIALS AND METHODS FOR REDUCING BIOFOULING IN WATER TREATMENT MEMBRANE SYSTEMS

CROSS REFERENCE TO RELATED APPLICATION

This application claims filing benefit of U.S. Provisional Patent Application Ser. No. 62/065,359, Confirmation No. 2781, entitled "Method for Reducing Biofouling in Water Treatment Membrane Systems Using Ultraviolet Radioluminescence" having a filing date of Oct. 17, 2014, which is incorporated herein in its entirety by reference.

BACKGROUND

In the face of growing fresh water scarcity concerns worldwide, the perception of water resources is rapidly shifting toward one of more direct cyclic systems of reuse. The United States leads the world in volume of wastewater reused (7.6 million m$^3$/d as of 2008), and more arid countries are obtaining a continually higher fraction of their drinking water from desalination and reclaimed sources. These trends are expected to continue as the supply of fresh water continues to decrease due to increasing municipal and agricultural demands as well as due to modern oil and gas extraction practices, which are generating increasing volumes of wastewater. A single hydraulic fracturing well, for example, can use over 3 billion gallons of water per year, much of which emerges as brine waste.

The practice of wastewater and drinking water treatment are thus converging into a single issue of resource management, creating new environmental engineering challenges. Advancement of reverse osmosis, nanofiltration, and advanced oxidation process technologies will directly impact the cost and availability of drinking water in the 21$^{st}$ century, with the potential to offer powerful treatment capabilities with modest space requirements.

Membrane filtration (e.g., nanofiltration) is widely used in industrial applications due to its ability to efficiently remove virtually particles larger than about 0.2 μm, including bacteria such as *Giardia lamblia* and *Cryptosporidium parvum*. Membranes are also a critical component in reverse osmosis desalination plants. As such, the use of membrane technologies has greatly increased over the course of the last two decades. As an example, the global installed capacity for low-pressure membrane systems, including drinking water, wastewater, and industrial water treatment plants, has grown from approximately 100 million gallons per day (MGD) in 1996 to almost 3,500 MGD in 2006.

Although membrane-based water treatment is an established industry, existing membrane technology is far from providing optimal sustainability, primarily due to performance decline caused by compaction, fouling, repeated cleaning to alleviate fouling, and resulting gradual deterioration of the membrane material. Biofouling in particular is one of the greatest operational challenges associated with reverse osmosis and nanofiltration, occurring when excessive biofilm accumulation within feed channels and on membrane surfaces degrades performance Bacterial biofouling is frequently encountered in systems in which source waters include brackish surface waters, e.g., rivers and coastal areas, which frequently include relatively large populations of bacteria. Bacteria easily colonize membrane surfaces in the treatment system environment and can form a thick biofilm mat that is difficult to eradicate once established.

Biofouling is not limited to bacterial sources, however, and other sources of biofouling include algae and fungi; bioproducts of any of these living organisms, such as humic acid or other organics; and combinations thereof. Any of these biofouling sources may clog a membrane and reduce flow, and may provide nucleation sites for scale deposits, which also inhibit flow. In either case, the result is reduced membrane performance as well as, frequently, degradation of the membrane polymer itself.

The primary method utilized to deal with biofouling has been to replace membranes once they have become unacceptably fouled. This, however, disrupts operations and is economically undesirable, leading to slower acceptance of membrane-based environmentally friendly treatment options for large water treatment facilities. Another method is to treat the membranes off-line to remove the biofouling. This also disrupts operation and is relatively costly. Still another approach is the in-line use of biocides such as DBNPA (2,2-bromo-3-nitrilopropionamide). Such compounds can be very effective at killing biofouling sources, but utilization has been limited to production of water for industrial purposes due to the concern that biocide levels effective to treat the membrane could contaminate the permeate water with the biocide or its by-products and render the permeate unacceptable for municipal water use. Because of this concern, the water produced during treatment with these biocides is, at present, discarded as waste.

Halogens, primarily chlorine in the form of sodium hypochlorite or chlorine gas, have been used to control biofouling. However, this treatment option requires a subsequent dehalogenation step in order to prevent the halogen from actually contacting and degrading the membrane surface and/or passing through to the permeate side of the membrane. The additional dehalogenation step adds to the expense and inconvenience of the water production process. Variations of the halogen approach have included combining an oxidizing biocide containing a halogen with a nitrogen compound, which helps to bind the halogen and thereby reduce its contact with the membrane. Examples of these combination oxidizing biocide materials include bromochlorodimethylhydantoin (BCDMH) and trichloro-isocyanuric acid. Other approaches to membrane biofouling have included use of peracetic acid, ultraviolet light, and ozone pretreatment operations. Unfortunately, peracetic acid will often accelerate the degradation of the membrane, and the ultraviolet light and ozone methods suggested to date have been extremely cost-intensive, particular when considered for use on the scale necessary for municipal water production.

What are needed in the art are methods and systems that can prevent biofouling of water treatment membranes without disrupting operation. Methods that can extend the life of treatment membranes in a cost-effective manner would be of great benefit.

SUMMARY

According to one embodiment, disclosed is a method for preventing biofouling of a water treatment membrane. For instance, a method can include directing X-rays into a membrane module at a luminescent material that emits energy in response to the X-rays. The emission can include energy at a wavelength in the violet to ultraviolet (UV) range (e.g., about 180 nm to about 440 nm). The luminescent material can be in optical communication with a water treatment membrane such that the emitted energy contacts the feed side of the water treatment membrane and in some embodiments can also contact the feed channel.

Systems are also described for carrying out the biofouling prevention methods. For instance, a system can include a fluid flow path and a water treatment membrane held in the fluid flow path. The system also includes the luminescent material that emits in the violet to UV range upon X-ray excitation. The luminescent material can be configured to be permanently or temporarily located in optical communication with the feed side of the water treatment membrane. For instance, the luminescent material can be contained in a fluid flow that circulates past the feed side of the membrane. Alternatively, the luminescent material can be confined on the membrane surface or on a structure in optical communication with the membrane surface, e.g., a spacer material, a housing, a membrane support structure, etc. The system can also include an x-ray source that is configured to deliver X-ray excitation to the luminescent material.

BRIEF DESCRIPTION OF THE FIGURES

A full and enabling disclosure of the subject matter, including the best mode thereof, directed to one of ordinary skill in the art, is set forth more particularly in the remainder of the specification, which makes reference to the appended figures in which:

FIG. 8 is a schematic illustration of one embodiment of a system as described herein FIG. 9 is a schematic illustration of another embodiment of a system as described herein.

FIG. 10 is a schematic illustration of another embodiment of a system as described herein.

Figure 1:
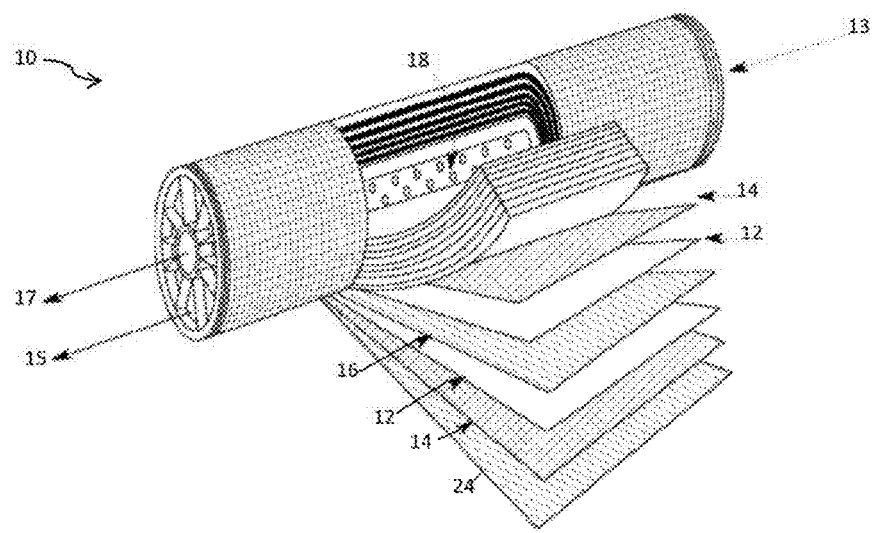
FIG. 1 illustrates a partially cut away isometric view of a spiral wound membrane module.

DETAILED DESCRIPTION OF
REPRESENTATIVE EMBODIMENTS

Reference now will be made in detail to various embodiments of the disclosed subject matter, one or more examples of which are set forth below. Each example is provided by way of explanation, not limitation. In fact, it will be apparent to those skilled in the art that modifications and variations may be made in the present disclosure without departing from the scope or spirit of the subject matter. For instance, features illustrated or described as part of one embodiment may be used on another embodiment to yield a still further embodiment. Thus, it is intended that the present disclosure covers such modifications and variations as come within the scope of the appended claims and their equivalents.

In general, disclosed herein are methods for preventing biofouling of membranes utilized in water treatment processes (i.e., water treatment membranes) and systems as may be utilized in carrying out the methods. More specifically, disclosed methods provide a route to in-line treatment of water treatment membrane modules using energy in the violet to UV range (e.g., from about 180 nm to about 440 nm) by use of luminescent materials that emit in the desired spectral range upon X-ray excitation. The disclosed methods can be utilized in conjunction with existing processing equipment and can prevent biofouling of water treatment membranes as well as feed channels in membrane modules in high volume treatment processes in an environmentally friendly fashion.

As utilized herein the term "X-ray" generally refers to a form of electromagnetic radiation having an Angstrom-scale wavelength and photon energies of from about $10^2$ electron-volts (eV) to about >$10^6$ eV. Based on the photon energies, X-rays can be further divided into the categories of "soft" X-rays (about $10^2$ eV to about $10^3$ eV), which are easily absorbed by materials through core electron excitations and photoelectric absorption, and "hard" X-rays (about $10^4$ eV or greater), which, in contrast, are highly penetrating. It should be noted that there is no physical difference between X-rays and gamma rays (γ-rays) of the same energy; the designation refers to origination from acceleration of electrons or from radioactive decay, respectively.

While X-rays are not typically associated with environmental technology, the recent introduction of high-efficiency field emitter sources can be beneficial in the disclosed methods and can provide for augmentation of existing advanced treatment processes using X-ray irradiation. Specifically, according to the present disclosure, the deep-penetrating ability of X-rays through water, polymers, and other X-ray transparent materials can be coupled with phosphors that luminesce under X-ray excitation to generate radiation capable of preventing biofouling within the interior of treatment systems. Such ability opens up numerous possibilities, including elimination of biofouling within membrane modules by one or more of UVA, UVB, UVC and violet emission.

Generally speaking, the present systems incorporate suitably emitting luminescent materials within a membrane module (e.g., a spiral wound reverse osmosis module). X-rays in the 100-300 keV range can then be generated exterior to the module and directed at the luminescent materials. At least a portion of the X-rays can penetrate the water and structural layers of the module and can excite the luminescent materials causing interior module emission capable of microbial inactivation and biofouling prevention. Compared to antifouling strategies that incorporate biocides into the membrane, microbial inactivation by interior module energy emission has the advantage of through-space action that can inactivate bacteria throughout the feed channel and penetrate chemical/colloidal fouling layers. The concept also allows for tunability of the biocidal action, as the X-ray intensity can be adjusted to respond to changing conditions and thereby save energy. Moreover, the long-term stability of inorganic phosphors can permit recycling/reuse of the luminescent materials.

The type of water treatment membrane module as may be treated by the methods is not particularly limited. For instance, the membrane system can include, without limitation, a microfiltration, ultrafiltration, nanofiltration, forward osmosis, reverse osmosis, membrane distillation, capacitance deionization, reverse electro-dialysis, or pressure retarded osmosis processing. The disclosed system can be utilized with any sort of water treatment, such as the treatment and/or recovery of tap-water, domestic wastewater, and industrial wastewater, or salt water. For instance, the disclosed systems can be utilized in a microfiltration or ultrafiltration process as is known for use in the pre-treatment of seawater desalinization.

Luminescent materials for use in the system can generally meet two basic criteria including (1) X-ray absorption within the desired excitation photon energy range; and (2) luminescence in the antimicrobial energy range, including germicidal UVC. In one particular embodiment, the luminescent materials can have a relatively high X-ray-to-UVC conversion efficiency, can remain stable in water, and present no concerns with regard to possible toxic effects on the permeate.

Effective photon energies will generally result from balancing the magnitudes of module material transmission with luminescent material absorption and in one embodiment can lie in the range of 100-300 keV. There are several luminescence mechanisms utilized in X-ray scintillators, each with certain characteristics and advantages. Selection of a particular luminescence type and luminescent material can thus depend upon the specific characteristics of the treatment system, and disclosed systems and methods are not limited to any particular luminescent material. It is well within the capabilities of one having ordinary skill in the art to select a luminescent material among commonly known materials that can be effectively excited by an applied range of photon energies and efficiently convert that energy into a desired emission range.

The luminescent material can generally emit energy at a wavelength between in the violet to UV range. For example, a luminescent material can emit in one or more ranges found within the violet to ultraviolet range of the spectrum. For instance, a luminescent material (or a combination of luminescent materials) can be utilized that can emit in one or more of the far ultra-violet (FUV) range (about 100 nm to about 200 nm), the middle ultra-violet (MUV) range (about 200 nm to about 300 nm), the near ultra-violet range (NUV) (about 300 nm to about 400 nm), the UVC range (about 100 nm to about 290 nm), the UVB range (about 290 nm to about 320 nm), and/or the UVA range (about 320 nm to about 400 nm).

In one embodiment, the luminescent material can emit primarily or solely in the UVC range. For instance, the luminescent material can incorporate the lanthanide praseodymium ($Pr^{3+}$), which has been shown to exhibit interconfigurational ionic transitions. The 5d→4f transition energies of $Pr^{3+}$ reside in the UV range, and when doped into the proper host crystal, recombination of excitons at $Pr^{3+}$ centers can result in UVC emission. Specifically, the interconfigurational emission of $Pr^{3+}$ typically consists of a broad peak arising from $4f5d→^3H_J$ transitions with a shoulder peak at lower energy from $4f5d→^3F_J$ transitions. To maximize the fraction of emission that lies within the germicidal wavelength range, the phosphor can be one for which this entire emission band occurs below 280 nm, requiring a relatively high-energy 4f5d band edge of approximately >43,500 $cm^{-1}$. However, hosts yielding $Pr^{3+}$ band edges greater than ~47,000 $cm^{-1}$ show visible light cascade emission from the $^1S_0$ state, rather than UV emission. Coordination of $Pr^{3+}$ to $BO_3^{3-}$, $PO_4^{3-}$, and $F^-$ (in some cases) can result in a 4f5d band edge within the desired range. By way of example, and without limitation, $Pr^{3+}$ luminescent materials achieving X-ray-to-UVC conversion can include $Y_2SiO_5$:$Pr^{3+}$, $Lu_2SiO_5$:$Pr^{3+}$, $KY_3F_{10}$:$Pr^{3+}$, $Ca_3(BO_3)_2$:$Pr^{3+}$, and $Lu_{10}O_9F_{12}$:$Pr^{3+}$.

Of course, the luminescent materials are not limited to crystalline hosts doped with $Pr^{3+}$. Other suitable luminescent materials can include crystalline hosts doped with activator ions including, but not limited to, $Bi^{3+}$, $Ce^{3+}$, $Tm^{3+}$, $Nd^{3+}$, $Gd^{3+}$, $Pb^{2+}$, or any combination of dopants.

Activator dopants capable of forming UVA emitting materials can be utilized in one embodiment. These materials may be beneficial as the theoretical maximum quantum efficiency for UVA is high, with the energy of one X-ray photon translating into a larger number of UVA photons than UVC photons. Examples of $Ce^{3+}$-doped scintillators capable of UVA emission include, without limitation, $Gd_2Si_2O_7$:$Ce^{3+}$, $SrF_2$:$Ce^{3+}$, and $K_2NaLuF_6$:$Ce^{3+}$.

In another embodiment, the luminescent material can include a crystalline host including cationic components such as, without limitation, $Rb^+$, $Ba^{2+}$, $La^{3+}$, $Y^{3+}$, $Gd^{3+}$, $Bi^{3+}$ or $Lu^{3+}$.

In one embodiment, the luminescent material can include a compound having one of the following general structures:
$AMLn(BO_3)_2$, $A_3Ln_3(BO_3)_4$, $LnPO_4$, $M_2Ln_3(SiO_4)_3X$, $M_2Ln_{2.67}(SiO_4)_2(PO_4)X$, $M_5Ln_5(SiO_4)_3(PO_4)_3O_2$, $ALnX_4$, $MLnX_5$, $MX_2$, $BiX_3$, $BiOX$, $Bi_2OX_4$, $LnOX$, $Ln_7O_6X_9$, $Ln_{10}O_9X_{12}$, $Ln_5O_4X_7$, $Ln_2SiO_5$, or $Ln_2Si_2O_7$,
wherein
A=$Li^+$, $Na^+$, $K^+$, and/or $Rb^+$;
M=$Mg^{2+}$, $Ca^{2+}$, $Sr^{2+}$, and/or $Ba^{2+}$;
Ln=$Y^{3+}$, $La^{3+}$, $Gd^{3+}$, and/or $Lu^{3+}$;
X=$F^-$, $Cl^-$, and/or $Br^-$.

Luminescent materials are not confined to those that incorporate an activator dopant. For instance, luminescent materials can include those capable of direct electron-hole recombination in insulators with appropriate band gaps capable of producing photons with the desired wavelengths when excited by ionizing radiation. For instance, $Lu_2O_3$ nanocrystals, which, when excited by X-rays, can show emission peaking at 260 nm and may be utilized in disclosed systems. This peak is understood to be due to direct radiative recombination of electrons and holes, and can be accompanied by less intense, lower energy emissions due to recombination at impurities.

Ideally, the luminescent material can exhibit a high efficiency in converting the excitation X-ray energy to the emission energy. Scintillation efficiencies are typically indicated as relative to $Bi_4Ge_3O_{12}$ (BGO), one of the most efficient visible light emitting scintillators, which produces 8500 photons per MeV of radiation absorbed. Efficiencies of the luminescent materials can generally range from 0.1 to about 4.5 of that of BGO.

In general, the luminescent materials can be in the form of micro- or nano-sized particles. As utilized herein, a microparticle can general have an average diameter of less than about 1000 micrometers (μm), less than about 500 μm, or less than about 100 μm. A nanoparticle generally is a particle having an average diameter of less than about 1000 nanometers (nm), less than about 500 nm, less than about 100 nm, or less than about 50 nm. The particles can generally exhibit high quantum efficiency, stability, and a relatively long lifetime to allow efficient energy transfer over a long lifetime. In one embodiment, the particle can have a diameter of from about 5 nm to about 10 μm. Particles can generally be of any shape. For instance, particles can be generally spherical, ovoid, amorphous, or spindle shaped. The shape of a particle can generally depend upon materials of formation and/or formation conditions as is known in the art.

The luminescent materials can be located in optical communication with any water treatment membrane as is generally known in the art. In one particular embodiment, commonly known reverse osmosis polyamide, nanofiltration polyamide, or ultrafiltration polysulfone membranes can be treated as disclosed to prevent biofouling. However, the skilled artisan will appreciate that as the internally emitted energy can positively influence the fouling characteristics of membrane modules incorporating these types of membranes, it can also positively influence the fouling characteristics of other membranes and filter media.

The membrane may include, but is not limited to, one or more of the following polymers: acrylate polymers (e.g., polymethylmethacrylates), polystyrenes, polycarbonates, polyimides, epoxy resins, cyclic olefin polymers, polyesters (e.g., polyethylene teraphthalate, polyphenylene vinylene, etc.), polyether ether ketones, poly(N-vinylcarbazole), polysulfones, acrylonitriles, poly(arylene oxide), piperazine-containing polymers, cellulosic polymers (e.g., cellulose acetate-butyrate, cellulose propionate, ethyl cellulose, methyl cellulose, nitrocellulose, etc.), polyamides, poiyimides (e.g., polyetherimide, etc.), polyethers, poly(arylene oxides) (e.g., poly(phenylene oxide), poly(xylene oxide), etc.), polyurethanes, poly(acrylates), polysulfides, polyolefins (e.g., poly(ethylene), poly(propylene), poly(butene-1), poly(4-methyl pentene-1), etc.), polyvinyls (e.g., poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly (vinyl pyridines), poly(vinyl pyrrolidones), poly(vinyl ethers), poly(vinyl ketones), poly(vinyl aldehydes), poly (vinyl formal), poly(vinyl butyral), poly(vinyl amides), poly (vinyl amines), poly(vinyl urethanes), poly(vinyl ureas), poly(vinyl phosphates), poly(vinyl sulfates), etc.), polyallyls; poly(benzobenzimidazole), polyhydrazides, polyoxadiazoles, polytriazoles, poly(benzimidazole), polycarbodiimides, polyphosphazines, as well as copolymers, derivatives, and combinations thereof.

Polymeric water treatment membranes are commonly made of the following polymers: poly(ether sulfone), polysulfone, poly(vinylidene difluoride), poly(vinyl chloride), polyacrylonitrile copolymers, polyacrylonitrile cellulose acetate, polyamides (aromatic), cellulose acetate, polypropylene and polyethylene. In one particular embodiment, the membrane can include polyvinylidene fluoride, polystyrene, polyethylsulfone, polypropylene, polysulfone, polytetrafluoroethene, polyamide, polyimide, or polyvinyl chloride, which can be treated as disclosed herein.

A membrane can generally be a component of a module to which a feed stream is supplied and a permeate stream and a concentrate stream exits. During operation of a biofouling prevention method, the luminescent material(s) can be in optical communication with a membrane so as to prevent biofouling of the membrane. In one particular embodiment, the luminescent material can also be in optical communication with feed channels of the water treatment membrane module and prevent biofouling throughout the water treatment module.

The luminescent materials can a permanent component of a membrane of the system or can be temporarily associated with the membrane during a treatment protocol. For instance, in those embodiments in which the membrane is formed of an X-ray transparent material, the luminescent material can be a component of the composition that forms the membrane. According to this embodiment, a polymeric composition that incorporates the luminescent material can be processed according to known membrane formation processes (extrusion, etc.) and the formed membrane can include the luminescent material within the membrane matrix.

In another embodiment, the luminescent material can be adhered to a membrane surface and permanently held optical communication with the active layer of the membrane (e.g., attached to the feed side of the membrane). For instance, a luminescent material can be anchored to a polymeric membrane such that the presence of the luminescent material does not detrimentally affect the flux characteristics of the membrane. For example, the luminescent material can be adhered to the membrane surface by sorption, direct bonding, or indirect bonding by use of an anchoring functionality.

In one embodiment, a polymeric anchoring material that does not excessively affect the flux capabilities of the membrane, such as polydopamine, polyethylene glycol, etc., can be utilized to indirectly bond the luminescent material to the membrane. For example, a polydopamine layer as described in U.S. Pat. No. 8,017,050 to Freeman, et al., which is incorporated herein by reference, can be utilized to bond the luminescent materials to a water treatment membrane.

A polydopamine layer can be formed on the membrane via polymerization of a dopamine monomer onto the surface of the membrane or alternatively, via attachment of a preformed polymer to the membrane. For example, the feed side of a membrane can be contacted with a buffered solution having a pH greater than 7 and comprising a dopamine compound of the following general structure:

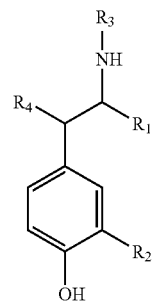

in which $R_1$ represents a hydrogen atom or —COOH, $R_2$ represents a hydrogen atom or —OH, $R_3$ is hydrogen or C1-C6 group and $R_4$ represents a hydrogen atom hydrogen or —OH.

Upon contact, the polydopamine can polymerize via condensation to the surface of the membrane.

The luminescent material, generally in the form of particles, can be adhered to the polydopamine at the time of the polymerization reaction or following initial polymerization of the polymer, as desired. For instance, the feed side of the membrane including the polydopamine anchoring layer can be placed in contact with a suspension of the luminescent material particles at a pH of about 7 or greater and the particles can be bonded to the polydopamine.

According to one embodiment, in the dopamine compound above, at least one of $R_1$, $R_3$ and $R_4$ is hydrogen. In some embodiments, the group $R_2$ is OH. In one embodiment, the dopamine compound can be selected from dopamine, L-dopa, epinephrine and norepinephrine. For instance, dopamine of the following formula can be polymerized to adhere the luminescent nanoparticles to the feed side of a water treatment membrane:

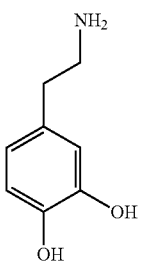

According to one such embodiment, the polydopamine of the shell can have the following general structure:

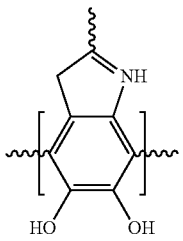

In one embodiment, a membrane can be a component of a direct contact membrane filtration system. By way of example, a system can include a spiral wound water treatment membrane module, one embodiment of which is illustrated in FIG. 1. The basic unit of the membrane module 10 can be a sandwich of flat sheets formed as layers including a pair of separation membranes 12, a permeate spacer (also known as a permeate collection material) 16 between the separation membranes 12 and feed channel spacers 14 on either side of the separation membranes 12. The various layers together form an "envelope" that can be wound around a central perforated tube 18. The layers of an envelope (12, 14, 16) are generally adhered together along three edges, with the unsealed edge adhered to a perforated central tube 18.

During use, a feed stream 13 can enter the spacer channels at the end of the spiral-wound element in a path parallel to the central tube. As the feed water flows through the spacers 14, a portion of the water permeates through either of the two surrounding membrane layers 12 and into the permeate carrier 16, leaving behind any dissolved and particulate contaminates that are rejected by the membrane 12. Water that passes through the membrane 12 and into the permeate carrier 16 travels spirally inward toward the central collector tube 18 where it is collected as the permeate stream 17. Water on the feed side of the membrane 12 that does not permeate through the membrane continues to flow across the membrane surface in the feed spacers 14, becoming increasingly concentrated with rejected contaminates. This concentrate stream 15 exits the element parallel to the central tube 18 through the opposite end from which the feed stream 13 entered. A module can also include an outer wrap 24 that can surround the envelope and keep it from unwinding in use.

One or more of various other components as are known in the art may also be present in the module 10. For example, the envelope(s) may be sealed with an adhesive. In a multi-stage module, two or more center tubes 18 may be connected in series by element interconnectors. A module typically includes O-rings, brine seals or other end-seal gaskets and other seals. Folds in an envelope may be reinforced with a tape or film. A film or tape may also be used to provide an inner wrap.

The spacer membranes, permeate membranes, outer wrap, support structures, etc., can generally be formed of materials that are capable of transmitting X-rays there through such that at least a portion of the X-rays can interact with the luminescent materials held in the module. For instance, in those embodiments in which the luminescent material is bonded to the feed surface of the water treatment membrane 12 (e.g., by use of a polydopamine anchoring agent), the X-rays can pass through the components of the module to contact and excite the luminescent materials at the surface of the membrane 12, and the resulting emission can prevent biofouling of the membrane 12.

The luminescent material need not be adhered directly to the membrane itself. In some embodiments, the luminescent material can be adhered to another component of a system such that it is in optical communication with the feed side of the membrane, e.g., a spacer material, a housing, a support structure, etc. For example, the luminescent materials can be adhered to a structure on the feed side of the water treatment membranes 12. In one embodiment, the luminescent materials can be sorbed or bonded to the feed spacers 14 such that the luminescent emissions can contact the feed side of the treatment membranes.

A feed spacer is normally made of a sheet of plastic (for example polypropylene) mesh or netting. The primary purpose of the feed spacer is to create a space for the feed water to flow between adjacent membrane envelopes, and to create turbulence on the surfaces of the water treatment membranes. The turbulence reduces concentration polarization and so increases the net driving pressure available to generate permeate.

Attachment mechanisms for adhering the luminescent materials to a secondary structure such as the feed spacers can utilize any suitable materials and mechanisms as are known in the art. For instance, in one embodiment, the luminescent materials can be adhered to a feed spacer by use of a cross-linked epoxy anchoring layer as described in U.S. Pat. No. 7,026,014 to Luzinov, et al., which is incorporated herein by reference. Briefly, a polymer that includes multiple epoxy groups can be applied to a surface of a feed spacer that faces the feed side of the water treatment membrane. Any high molecular weight polymer containing multiple epoxy groups can be utilized such as, and without limitation, epoxidized polybutadiene, epoxidized polyisoprene, or poly (glycidyl methacrylate), etc.

A portion of the epoxy groups on the polymer can react at the surface, thereby binding the polymer to the feed spacer. In certain embodiments, it may be useful to oxidize the surface of the feed spacer prior to application of the epoxy-containing polymer, so as to promote the attachment of the polymer to the surface.

Following initial attachment, the epoxy-containing polymer can be cross-linked by use of a second portion of the epoxy groups to form a cross-linked polymeric anchoring layer bound to the feed spacer. The polymer can retain an amount of epoxy functionality following cross linking. The luminescent material can be grafted to the surface of the feed spacer via this retained epoxy functionality.

In yet another embodiment, the luminescent material can be held in optical communication with the feed side of the water treatment membrane on a temporary basis, rather than permanently affixed. For instance, the luminescent material can be fed to the membrane module in conjunction with the feed stream and passed through the system on the feed side.

In this embodiment, the luminescent material can exit the module with the concentrate flow, from which it can be recovered for re-use.

Figure 2:
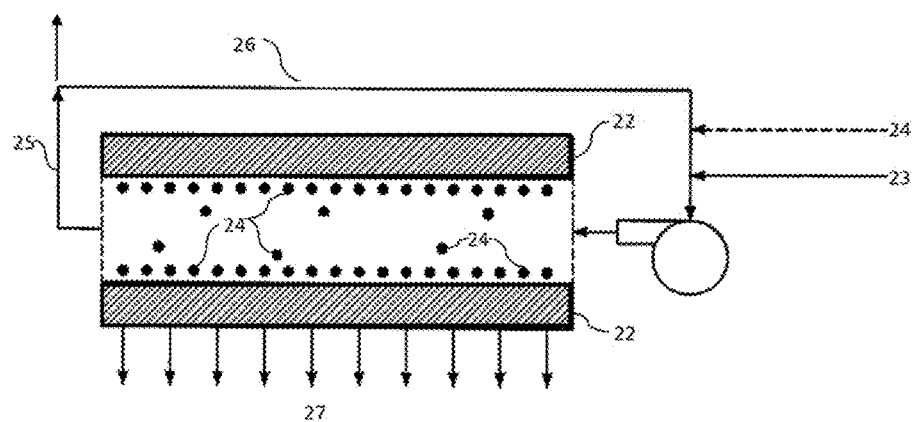
FIG. 2 is a schematic illustration of a membrane circulation loop employing a method as described herein.

One embodiment of a system in which the luminescent material is passed through the feed side of a membrane module is illustrated in FIG. 2. As shown, luminescent particles 24 can be dosed into a membrane system along with a feed stream 23 to be treated or can be utilized in a separate membrane treatment cycle carried out between regular water treatment cycles. A portion of the luminescent particles 24 can be deposited on the membrane 22 or alternatively they can become part of a recirculating flow 26 that continually passes out of the system with the concentrate stream 25. The dose of luminescent particles added can be sufficient to treat the membrane surface throughout the system.

In a treatment cycle, once all of the luminescent particles for one treatment cycle are added with the feed stream 23, the feed flow can continue, and no additional particles need to be added. During the remainder of the treatment cycle, the luminescent particles that are deposited on the membrane or are mixed with the flow in the circulating fluid can be excited by use of X-rays. The emissions from the particles 24 can contact the surface of the membrane 22 and prevent biofouling of the membrane.

Figure 3:
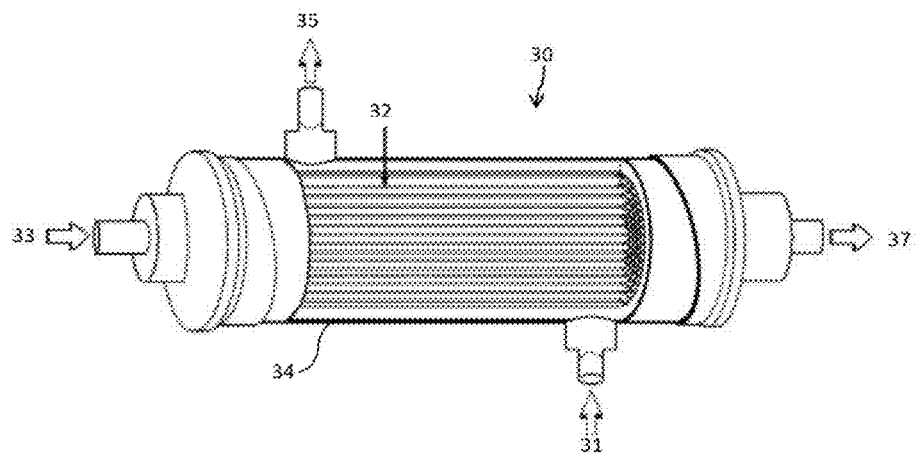
FIG. 3 illustrates a tubular module as may be utilized with hollow fiber membranes.

Another direct contact membrane system as may be processed according to the biofouling prevention method is a hollow fiber tube system, one embodiment of which is illustrated in FIG. 3. As illustrated, the module 30 can include a plurality of hollow fiber membranes 32 that can be glued or otherwise held in a housing 34. Hollow fiber tube configurations can have a very high packing density. The feed stream 33 can be introduced into the shell side or into lumen side of the hollow fibers 32, and the permeate flow 37 and concentrate flow 35 can exit the module as illustrated.

Because of the large active area combined with a small footprint, hollow fiber modules have great potential in commercial applications. An example of a membrane fiber useful in hollow fiber membrane modules can have an inside diameter on the order of about 1.0 millimeter and a wall thickness of about 0.4 millimeters. Most of the membrane wall is merely supporting material, in that the thickness of the membrane layer itself can generally be about 1.0 micrometer or less. Such types of membranes can typically be operated with a permeate flux on the order of about 150 L/m$^2$-hr. The composition of the membrane and the size of the pores of the membrane may vary over a wide range, depending on the particular contaminants that are to be removed.

Figure 4:
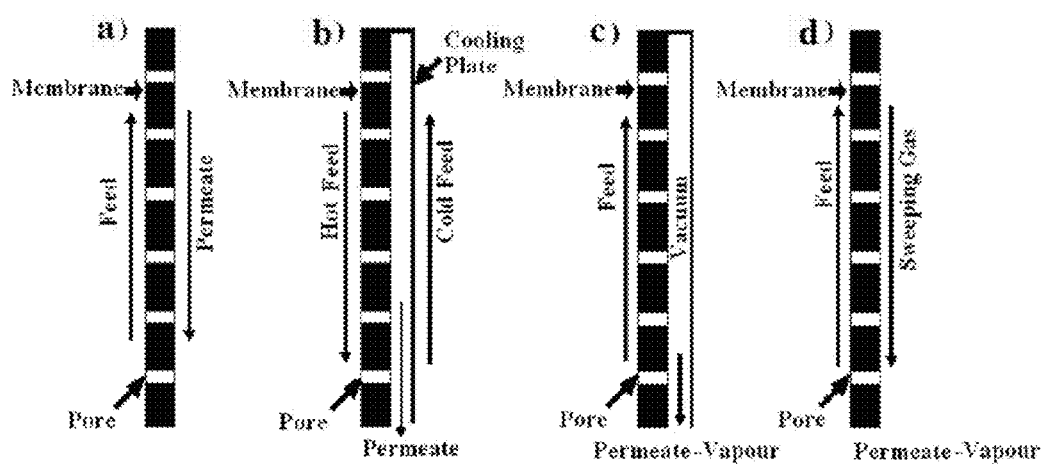
FIG. 4 illustrates examples of embodiments of membrane configurations encompassed herein including a) direct contact membrane systems; b) air-gap membrane systems; c) vacuum membrane systems; and d) sweep gas membrane systems.

The biofouling prevention can be utilized with any membrane system in which biofouling of the membrane is a potential issue and is not limited to direct contact membrane filtration systems. Examples of membrane systems encompassed herein include, but are not limited to, direct contact membrane systems, air gap membrane systems, vacuum membrane systems, and sweep gas membrane systems, examples of which are illustrated in FIG. 4. A direct contact membrane system (FIG. 4a) is a system in which the membrane is in direct contact with liquid phases. This is the simplest configuration capable of producing reasonably high flux. It is generally utilized for applications such as reverse osmosis, ultrafiltration, desalination and concentration of aqueous solutions (e.g., formation of juice concentrates), embodiment of which are described above. An air gap membrane system (FIG. 4b) is one in which an air gap is interposed between the membrane and the condensation surface. This configuration has high energy efficiency, but the flux obtained is generally low. The air gap configuration can be widely employed for most membrane applications, particularly where energy availability is low. Vacuum membrane systems (FIG. 4c) include those systems in which the permeate side is vapor or air under reduced pressure, and if needed, permeate is condensed in a separate device. This configuration is useful when volatiles are being removed from an aqueous solution. Sweep gas membrane systems (FIG. 4d) include those systems in which stripping gas is used as a carrier for the produced vapor. It is generally used when volatiles are removed from an aqueous solution.

Figure 5:
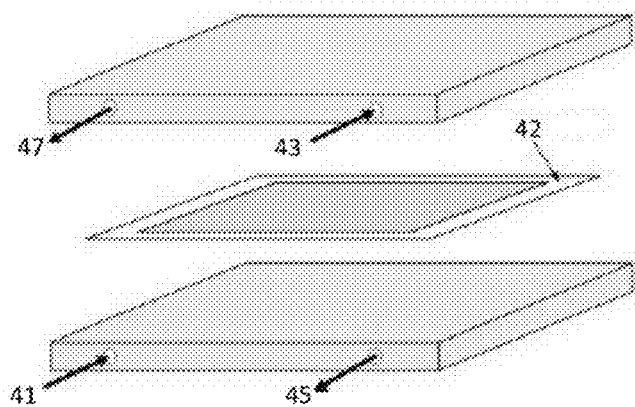
FIG. 5 illustrates a plate and frame module for flat sheet membrane system.

Any membrane system subject to biofouling is encompassed herein. FIG. 5 illustrates the structure of a plate and frame module as may be utilized in conjunction with the disclosed methods. This module type is suitable for flat sheet membranes 42 with feed stream inflow 43, concentrate outflow 47, permeate outflow 45 and optional cooling water or other inflow on the permeate side 41 and can be used for direct contact systems, air gap systems, vacuum membrane systems, and sweep gas systems. Although this configuration has a relatively smaller effective area for the same volume when compared to the tubular modules, it is easy to construct and multiple layers of flat sheet membranes can be used to increase the effective area. In addition, it can be easy to change damaged membranes from this configuration. The flow dynamics of flat sheet modules can be improved by the use of spacers that increase turbulence and reduce temperature polarization.

Figure 6:
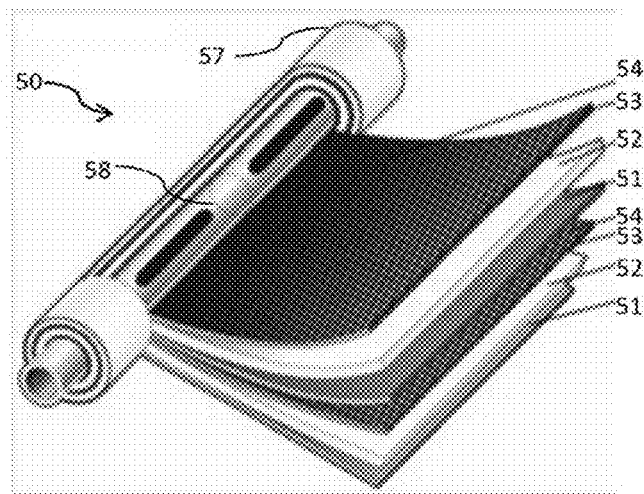
FIG. 6 illustrates an example of an electro deionization module.

Another membrane system as can be treated as disclosed herein includes electro deionization systems, an example of which is illustrated in FIG. 6. Electro deionization or EDI, is a continuous and chemical free process of removing ionized and ionizable species from the feed water using DC power. EDI is typically used to polish reverse osmosis (RO) permeate and to replace conventional mixed bed on exchange, which can eliminate the need to store and handle hazardous chemicals used for resin regeneration and associated waste neutralization requirements.

An EDI module 50 can generally utilizes a spiral wound design containing cation exchange resins 51 as well as anion exchange resins 53 in conjunction with feed spacers 52 and concentration spacers 54 wound around a central core 58 and sealed in a pressure vessel 57. EDI modules can produce permeate with high on rejection, e.g., high silica and boron rejection.

EDI can remove ionizable species from liquids using electrically active media and an electrical potential to affect on transport. It differs from other water purification technologies such as conventional ion exchange in that it is does not require the use of chemicals such as acid and caustic. EDI is commonly used as a polishing process to further de ionize reverse osmosis permeate.

Figure 7:
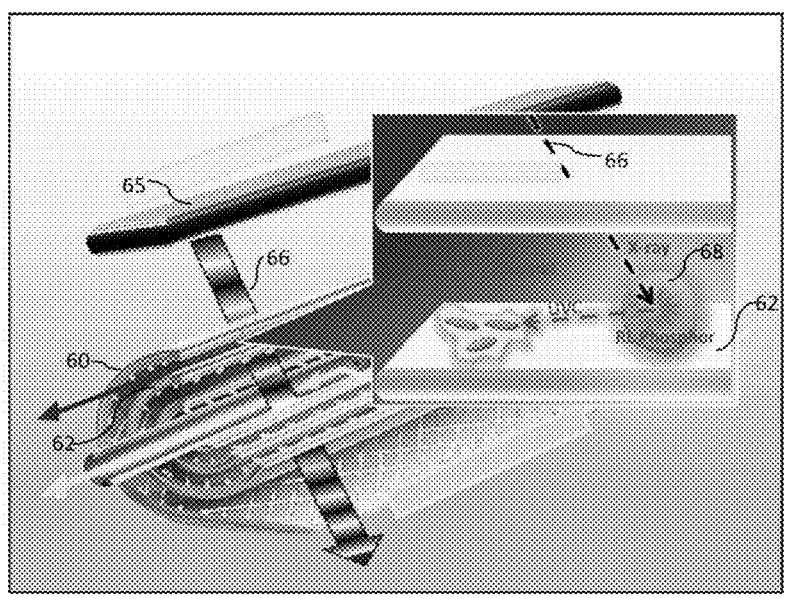
FIG. 7 illustrates one embodiment of a system in conjunction with a spiral wound membrane module.

FIG. 7 schematically illustrates a method of preventing biofouling of a water treatment membrane 62 held in a spiral wound membrane module 60. As shown, the system can include an X-ray source 65 that can emit X-rays directed at the module 60.

In one embodiment, an X-ray source can deliver hard X-rays to a luminescent material. Absorption of hard X-rays by matter can result in ionization of an electron with high resulting kinetic energy. The electron can then interact with adjacent matter to produce additional ionization events until its kinetic energy is sufficiently lowered to allow re-association with an atomic nucleus. The end result of photoelectric absorption is emission of lower energy electromagnetic radiation, heating, and formation/destruction of chemical bonds. As seen in Table 1, below, attenuation coefficient control for 150 keV photons of water and typical polymers as may be found in a membrane module are only about 0.15 cm$^2$/g ($\mu/\rho$), giving an attenuation length ($I/I_0=1/e$) of about 6 to about 7 cm. Considering an X-ray source applied to the exterior of a typical 8 inch diameter (10.2 cm) water treatment membrane module, with average $\mu$ and $\rho$ of 0.15 cm$^2$/g and 1.2 g/cm$^3$, respectively, the radiation intensity would be reduced only by 84% by the time it reaches the permeate tube center, which can successfully generate desired treatment energy from a luminescent material in optical contact with the membrane to be treated.

TABLE 1

| Material | $\mu$ (cm$^2$/g) @150 keV | $\rho$ (g/cm$^3$) |
|---|---|---|
| Water | 0.15 | 1.00 |
| Polyamide (active layer) | 0.15 | 1.15 |
| Polypropylene (feed spacer) | 0.15 | 0.95 |
| Polyester (permeate spacer) | 0.15 | 1.40 |
| Fiber Reinforced Plastic (shell) | 0.23 (estimated) | 1.85 |

Any suitable X-ray source is encompassed herein. For example, conventional vacuum tube sources such as are known in medical imaging, crystallography, and nondestructive testing can be utilized. Such sources typically employ a heated metal filament within a vacuum tube, spaced apart from a metal target. When a strong potential is applied across the gap, electrons are stripped from the filament and accelerated toward the metal. Upon hitting the target, which may consist of tungsten, molybdenum, or copper, among other metals—the electrons can be scattered by the metal atoms and their rapid deceleration induces a broad spectrum of X-ray emission, known as Bremsstrahlung radiation. A portion of these X-rays can escape through a window, and the majority can be absorbed by the target and dissipated as heat to yield typical energy efficiencies of around 1%. The maximum X-ray photon energy is governed by the electron acceleration potential, thus a source operating at 150 kV can produce X-rays with maximum photon energy of 150 keV.

As illustrated in FIG. 7, during use, the X-ray source 65 can emit X-rays 66 that can be directed into the module 60. The materials of formation of the module 60 can transmit the X-rays 66 to the interior of the module 60 and they can contact and excite the luminescent material 68. Upon excitation, the luminescent material 68 can emit energy in the desired range, e.g., UVC, which can contact the membrane 62 and any biological material present that is capable of forming a biofilm on the membrane 62.

The dose rate of the treatment energy and the related generation rate of the X-rays, can generally vary depending upon the specific characteristics of the system. For instance, literature describing the inactivation rates of bacteria in response to UVC radiation may provide useful information regarding the general effect of dose or dose rate, but may underestimate antibiofilm potential. This possibility is based on the fact that bacteria need not be killed or even inactivated to prevent them from adhering to surfaces and producing biofilm. By way of example, UVC flux as low as 0.016 $\mu$W/cm$^2$ has been shown suitable to significantly impair biofilm establishment by *Pseudomonas aeruginosa*. In addition to suffering damage to nucleic acids and proteins in the presence of germicidal radiation, bacteria can also delay quarum sensing activities in favor of stationary or vegetative behavior. Consequently, the X-ray intensity utilized in a treatment protocol can be optimized to achieve biofouling prevention while avoiding the higher energy expenditure that would be required to yield disinfection-strength UVC intensities.

An X-ray source can have any suitable design and orientation so as to continually or periodically transmit X-rays to the luminescent material within the membrane modules. For instance, flat-panel sources as have been recently developed exhibiting high efficiencies and output capabilities can be utilized. Products developed by Stellarray and Radius Diagnostics can be utilized in one embodiment. In some embodiments, an X-ray source can include, without limitation, a concentric tube X-ray source, a panoramic X-ray source, and/or a pulsed X-ray source.

An X-ray source that utilizes an electron emitter, such as nanodiamond or carbon nanotubes, coupled with extraction electrodes, can be utilized that can eliminate the need for hot metal filaments. An X-ray source that incorporates thin metal targets that allow X-rays to be transmitted in the same direction as the electron beams can increase X-ray production efficiency and can further reduces heating. Sources that produce wide, collimated X-ray emission and use less power than conventional sources such as have been commercialized for X-ray imaging and blood leukocyte inactivation can be utilized in some embodiments. By way of example, flat panel sources available from Stellarray that can achieve X-ray fluxes of 10$^{10}$ photons/cm$^2$·s operating at 150 kV, with a 35×10 cm panel consuming 405 W of electricity can be utilized in one embodiment.

FIG. 8, FIG. 9, and FIG. 10 illustrate exemplary embodiments of arrangements between an X-ray source 85 and water treatment modules 80. As shown in FIG. 8, an X-ray source, e.g., a flat panel X-ray source 85 can be held on a track 86 that can allow the X-ray source 85 to move past a plurality of water treatment modules 80 as shown by the directional arrow. In this embodiment, the X-ray source can periodically deliver X-rays to each water treatment module 80 in turn.

In the embodiment of FIG. 9, an X-ray source 85 can encircle a water treatment module 80 as shown for delivery of X-rays to the luminescent material within the module 80. In other embodiments, a single X-ray source can encircle a plurality of modules, as would be evident to one of ordinary skill in the art.

FIG. 10 illustrates yet another arrangement between the components of a system. In this embodiment, a central X-ray source 85 can deliver X-rays to a plurality of water treatment modules 80 that surround the source. Of course, modification of any design is well within the capability of one of ordinary skill in the art and is encompassed herein.

A system can optionally include shielding as is known in the art for containing X-ray radiation. Shielded X-ray sources as are known in routine practice of scientific, medical, and industrial operations can be utilized in conjunction with the treatment methods. In fact, as typical water treatment membrane separations largely operate autonomously without close operator presence, less shielding may be necessary as compared to more operator intensive processes.

Beneficially, drinking water that has been exposed to ionizing radiation in the disclosed processes can also show some chemical alteration of contaminants and resulting decontamination, as is seen with chlorination and advanced oxidation processes.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of any appended claims and any equivalents thereto.

What is claimed is:

1. A method for preventing biofouling of a water treatment membrane, the method comprising directing X-rays into a water treatment membrane module and at a luminescent material within the water treatment membrane module, the luminescent material emitting energy in response to the X-rays, the emission including energy at a wavelength in the violet to ultraviolet range, the luminescent material being in optical communication with a water treatment membrane such that the emitted energy contacts a feed side of the water treatment membrane, the water treatment membrane being contained within the water treatment membrane module.

2. The method of claim 1, wherein the emission comprises energy at a wavelength of from about 180 nanometers to about 440 nanometers.

3. The method of claim 1, wherein the luminescent material is adhered to the water treatment membrane or to a component of the water treatment module that is adjacent to the water treatment membrane.

4. The method of claim 1, wherein the luminescent material is carried in a fluid flow that passes the feed side of the water treatment membrane.

5. The method of claim 1, wherein the X-rays are at an energy level of from about 100 kilo electron-volts to about 300 kilo electron-volts.

6. The method of claim 1, wherein the method is carried out in conjunction with a water treatment method.

7. The method of claim 6, wherein the water treatment method is a microfiltration, ultrafiltration, nanofiltration, forward osmosis, reverse osmosis, membrane distillation, pressure retarded osmosis treatment, or electro deionization method.

8. The method of claim 6, wherein the water treatment method is configured for treatment of tap water, domestic waste water, industrial waste water or salt water.

9. The method of claim 1, wherein the emission includes energy at a wavelength of one or more of from about 100 nanometers to about 200 nanometers, from about 200 nanometers to about 300 nanometers, from about 300 nanometers to about 400 nanometers, from about 100 nanometers to about 290 nanometers, from about 290 nanometers to about 320 nanometers, or from about 320 nanometers to about 400 nanometers.

10. The method of claim 1, wherein the X-rays are continually or periodically directed at the luminescent material.

11. The method of claim 10, wherein the X-rays are emitted from an X-ray source, the X-ray source periodically passing the water treatment membrane module.

12. The method of claim 1, wherein the luminescent material is in optical communication with a feed channel of the water treatment membrane module such that the emitted energy contacts the feed channel.

* * * * *